United States Patent
Satyanarayana (10) Patent No.: US 10,796,509 B2
(45) Date of Patent: Oct. 6, 2020

(54) EJECTABLE FLIGHT DATA RECORDER UNIT

(71) Applicant: Airbus Operations Limited, Bristol (GB)

(72) Inventor: Kartik Satyanarayana, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 263 days.

(21) Appl. No.: 15/897,929

(22) Filed: Feb. 15, 2018

(65) Prior Publication Data
US 2018/0232970 A1    Aug. 16, 2018

(30) Foreign Application Priority Data
Feb. 16, 2017    (GB) .................................... 1702531.3

(51) Int. Cl.
| | |
|---|---|
| *B64D 25/20* | (2006.01) |
| *B64D 45/00* | (2006.01) |
| *G07C 5/08* | (2006.01) |
| *B64C 39/02* | (2006.01) |

(52) U.S. Cl.
CPC .......... *G07C 5/0858* (2013.01); *B64C 39/024* (2013.01); *B64D 25/20* (2013.01); *B64D 45/00* (2013.01); *B64C 2201/08* (2013.01); *B64C 2201/102* (2013.01); *B64C 2201/122* (2013.01); *B64C 2201/201* (2013.01); *B64C 2201/206* (2013.01); *B64D 2045/0065* (2013.01)

(58) Field of Classification Search
CPC ......................... B64D 2045/0065; B64D 25/20
See application file for complete search history.

(56) References Cited

U.S. PATENT DOCUMENTS

| | | | | |
|---|---|---|---|---|
| 6,450,454 B1* | 9/2002 | Boz, II | ..................... | B64G 1/52 244/158.1 |
| 2003/0152145 A1* | 8/2003 | Kawakita | ................. | H04N 5/77 375/240.12 |
| 2011/0060498 A1* | 3/2011 | Cannon | ................ | G07C 5/0858 701/33.4 |
| 2012/0166037 A1 | 6/2012 | Vinue Santolalla et al. ................ 701/32.2 |
| 2014/0142803 A1* | 5/2014 | Argillier | ................ | B64D 45/00 701/33.4 |
| 2016/0318616 A1* | 11/2016 | Fischer | ................... | G06F 1/181 |

(Continued)

FOREIGN PATENT DOCUMENTS

| | | |
|---|---|---|
| CN | 102750758 | 10/2012 |
| FR | 2 957 680 | 9/2011 |

(Continued)

OTHER PUBLICATIONS

EP Communication cited in EP 18 157 122.5 dated Jul. 12, 2019, 23 pages.

*Primary Examiner* — Daniel J Colilla (57) ABSTRACT

An apparatus for recording aircraft flight data including a primary flight data recorder unit for recording data generated by aircraft systems during operation of an aircraft and a secondary flight data recorder unit in communication with the primary flight data recorder unit. The secondary flight data recorder unit is configured to receive and store data from the primary flight data recorder. The secondary flight data recorder unit is ejectable from the aircraft, and comprises a propulsion system to enable powered flight of the secondary flight data recorder unit.

16 Claims, 4 Drawing Sheets

(56) References Cited

U.S. PATENT DOCUMENTS

2019/0168869 A1* 6/2019 Georges ................. B64D 47/02
2019/0315462 A1* 10/2019 Skladman ............. B64C 39/024

FOREIGN PATENT DOCUMENTS

WO          2016/141231        9/2016
WO     WO 2016/203322         12/2016

* cited by examiner

EJECTABLE FLIGHT DATA RECORDER UNIT

RELATED APPLICATION

This application claims priority to United Kingdom patent application GB 1702531.3 filed 16 Feb. 2017, the entirety of which is incorporated by reference.

TECHNICAL FIELD

The present invention relates to an apparatus for recording aircraft flight data, and to a method of storing aircraft flight data. In particular the invention relates to an apparatus to record aircraft flight data comprising an ejectable secondary flight data recorder unit having a propulsion system to enable powered flight of the secondary flight data recorder unit.

BACKGROUND

Aircraft typically carry a flight data recorder, commonly known as a "black box", to record flight data (including data on aircraft parameters) over the course of a flight. The flight data recorder receives the flight data from aircraft systems. A plurality of data having different format and content may be recorded by the flight data recorder. The recorded data may include, for example, data relating to height, velocity, route, pitch, aileron and/or flap position, throttle lever position, and engine parameters. Sounds may also be recorded, for example incoming and outgoing radio traffic, background noise in the cockpit, conversations/announcements of members of the flight crew, and acoustic fault indications. Recording of data by the flight data recorder may be carried out according to standards or safety regulations.

In the event of an accident, if the flight data recorder can be recovered the data stored therein can facilitate investigating the cause of the accident. However, if an accident occurs over the sea, mountains, or any other terrain which is not easily accessible, it can be very difficult or impossible to recover the flight data recorder. Consequently, in such cases it may be very difficult or impossible to determine the circumstances of the accident.

The present invention seeks to facilitate the recovery of aircraft flight data in the event of an accident in a location such that the flight data recorder is not easily recoverable.

SUMMARY

A first aspect of the present invention provides an apparatus for recording aircraft flight data. The apparatus comprises a primary flight data recorder unit for recording data generated by aircraft systems during operation of an aircraft and a secondary flight data recorder unit in communication with the primary flight data recorder unit. The secondary flight data recorder unit is configured to receive and store data from the primary flight data recorder. The secondary flight data recorder unit is ejectable from the aircraft, and comprises a propulsion system to enable powered flight of the secondary flight data recorder unit.

Optionally, the secondary flight data recorder unit further comprises a guidance system to guide the secondary flight data recorder unit to a selected destination. Optionally, the guidance system comprises a gyroscope. Alternatively or additionally, the guidance system may comprise a GPS system. Optionally the selected destination comprises the nearest land-based location to the last recorded location of the aircraft. Optionally the selected destination comprises the nearest marine body to the last recorded location of the aircraft. Optionally the nearest land-based location and/or the nearest marine body to the last recorded location of the aircraft is comprised in the aircraft flight data most recently received by the secondary flight data recorder unit from the primary flight data recorder unit.

Optionally, the secondary flight data recorder unit comprises one or more of: a power source; a wireless communications interface for wirelessly receiving data from the primary flight data recorder unit; a wired communications interface connectable to the primary flight data recorder unit by a data cable; a locating system to transmit a localization signal for facilitating locating of the secondary flight data recorder unit; a memory for storing received data; a camera for acquiring image and/or video data after ejection of the secondary flight data recorder unit from the aircraft.

Optionally, the propulsion system comprises one or more of: an electric motor; one or more rotors; one or more propellers.

Optionally, the secondary flight data recorder unit comprises a housing, the outer surface of which forms an aerofoil profile.

Optionally, the secondary flight data recorder unit comprises an unmanned aerial vehicle (UAV).

Optionally, the primary flight data recorder unit is configured to continuously transmit current flight data to the secondary flight data recorder unit.

Optionally, the secondary flight data recorder unit is configured to store flight data relating to a time period ending at the acquisition time of the most recently received flight data, and is configured to update the stored flight data when new flight data is received from the primary flight data recorder unit.

Optionally, the weight of the secondary flight data recorder unit is less than half the weight of the primary flight data recorder unit. Optionally the largest dimension of the secondary flight data recorder unit is less than half the largest dimension of the primary flight data recorder unit.

A second aspect of the present invention comprises an aircraft. The aircraft comprises an apparatus according to the first aspect; a conduit connecting a location of the secondary flight data recorder unit to the outside of the aircraft, for enabling ejection of the secondary flight data recorder unit from the aircraft; and an ejection mechanism for ejecting the secondary flight data recorder unit from the aircraft via the conduit. The ejection mechanism is configured to activate in response to a predetermined criterion being met.

Optionally, the ejection mechanism comprises a compressed air source for selectably delivering compressed air into the conduit to create a suction force at the location of the secondary flight data recorder. The compressed air source may be configured to deliver compressed air into the conduit in response to the predetermined criterion being met.

Optionally, the conduit comprises a first selectably openable door between the interior of the conduit and the outside of the aircraft and a second selectably openable door between the location of the secondary flight data recorder unit and the interior of the conduit. The first selectably openable door may be configured to open in response to the predetermined criterion being met. The second selectably openable door may be configured to open in response to the predetermined criterion being met. Each of the first and second selectively openable doors may be configured to open in response to the predetermined criterion being met.

Optionally, the ejection mechanism comprises at least one g-force sensor to measure current g-force on the aircraft, and the predetermined criterion comprises a minimum g-force threshold and is defined such that a current g-force less than the threshold does not meet the predetermined criterion and a current g-force greater than the threshold meets the predetermined criterion.

Optionally, the secondary flight data recorder unit comprises a rechargeable battery and the aircraft comprises a charging system configured to maintain the rechargeable battery in a substantially fully charged state.

A third aspect of the present invention provides a method of storing aircraft flight data relating to the operation of an aircraft. The method comprises receiving aircraft flight data at a primary flight data recorder unit; and sending, by the primary flight data recorder unit, at least some of the received aircraft flight data to a secondary flight data recorder unit. The secondary flight recorder unit is ejectable from the aircraft and comprises a propulsion system to enable powered flight of the secondary flight data recorder unit.

BRIEF DESCRIPTION OF THE DRAWINGS

Embodiments of the invention will now be described, by way of example only, with reference to the accompanying drawings, in which.

DETAILED DESCRIPTION

Examples described herein relate to apparatus for recording aircraft flight data. In general, each example apparatus comprises a primary flight data recorder unit for recording data generated by aircraft systems during operation of an aircraft, and a secondary flight data recorder unit in communication with the primary flight data recorder and configured to receive and store data from the primary flight data recorder. The secondary flight data recorder unit is ejectable from the aircraft, and comprises a propulsion system to enable powered flight of the secondary flight data recorder unit. The secondary flight data recorder unit may therefore be considered to be an unmanned aerial vehicle (UAV) (also known as a drone).

For the purposes of the present disclosure, the term "flight data" refers to any storable information generated by an aircraft system, which, after a flight accident may be useable for reconstructing the course of the accident and/or for tracking events, operating parameters and/or conditions relevant to the accident. Flight data in the sense of the present disclosure may include, for example, operating parameters of the aircraft such as flight altitude, flight speed, external pressure, temperature, fuel level, course, angle of inclination, rudder and flap positions, engine information and similar parameters. Furthermore, flight data may include media recordings in general, for example voice recordings of the pilot and/or the co-pilot in the cockpit, video recordings of the cockpit, voice recordings of the radio communications with base stations, other aircraft or tower staff of an airport, sound recordings of acoustic interference messages, video recordings of the display elements in the cockpit, announcements of the flight attendant crew in the passenger compartment and similar media data files.

Figure 1:
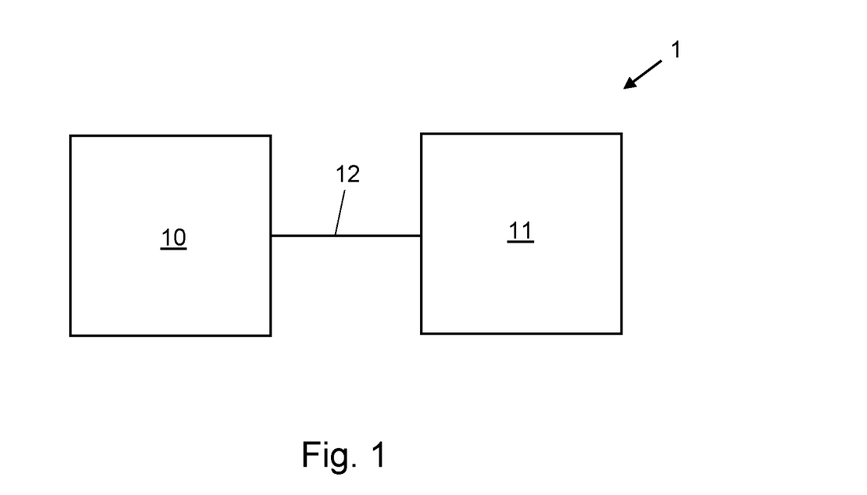
FIG. 1 shows a schematic view of an example apparatus to record aircraft flight data.

FIG. 1 shows an example apparatus 1 for recording aircraft flight data. The apparatus 1 comprises a primary flight data recorder unit 10 and a secondary flight data recorder unit 11. The secondary flight data recorder unit 11 is in communication with the primary flight data recorder unit 10 via a communications link 12.

The primary flight data recorder unit 10 is for recording data generated by aircraft systems during operation of an aircraft on which the apparatus 1 is installed. The primary flight data recorder unit 10 comprises a memory coupled to a controller. The primary flight data recorder unit 10 further comprises a communications interface for establishing and maintaining the communications link 12 with the secondary flight data recorder unit 11. The primary flight data recorder unit 10 may also comprise one or more further communications interfaces for communicating with other aircraft systems. The primary flight data recorder unit 10 is configured such that it can withstand high impact loads, high temperatures and temperature fluctuations, high water pressure and fire. In some examples the primary flight data recorder unit 10 may comprise a conventional "black box" flight data recorder, modified to send data to the secondary data recorder unit 11 in the manner described below.

The controller of the primary flight data recorder unit 10 is configured to receive flight data from a plurality of aircraft systems and to store the received flight data, with a time axis, in the memory. The controller of the primary flight data recorder unit 10 is also configured to transmit flight data to the secondary flight data recorder unit 11 via the communications link 12. In some examples the primary flight data recorder unit 10 (that is, the controller thereof) is configured to continuously transmit flight data to the secondary flight data recorder unit 11. The primary flight data recorder unit 10 may be configured to transmit flight data to the secondary flight data recorder unit 11 in real time, or near-real time. The primary flight data recorder unit 10 may be configured to transmit a particular item of flight data to the secondary flight data recorder unit 11 as soon as that item of flight data is received by the primary flight data recorder unit 10. The primary flight data recorder unit 10 may be configured to transmit all newly received flight data (that is, the flight data received from the aircraft systems and not yet transmitted to the secondary flight data recorder unit 11) to the secondary flight data recorder unit 11. In some examples the primary flight data recorder unit 10 may be configured to transmit part of the newly received flight data to the secondary flight data recorder unit 11. For example, where the received flight data comprises a plurality of types of flight data, the primary flight data recorder unit 10 may be configured to transmit some but not all of the types to the secondary flight data recorder unit 11. In such examples the transmitted types of flight data may comprise at least current flight data relating to the location of the aircraft.

Where reference is made to "current" flight data, this is intended to mean the flight data associated with the most recent time stamp of any existing flight data. In other words, current flight data is the most recently acquired or generated flight data. The most recently acquired/generated flight data may typically be the flight data most recently received by the primary flight data recorder unit 10 or by the secondary flight data recorder unit 11, although this need not necessarily be the case (e.g. if transmission issues cause less recently acquired/generated flight data to be resent after later acquired/generated flight data has been sent).

In some examples (particularly examples in which the communications link 12 is wireless) the primary flight data recorder unit 10 is configured to transmit encrypted flight data to the secondary flight data recorder unit 11. The controller of the primary flight data recorder unit 10 may be configured to encrypt the flight data received from aircraft systems before transmitting that flight data to the secondary flight data recorder unit 11, using any suitable encryption technique. In some examples the flight data may already be encrypted when it is received by the primary flight data recorder unit 10. Encrypting the flight data that is transmitted to the secondary flight data recorder unit 11 can reduce or eliminate the risk of the flight data being intercepted during transmission between the primary and secondary flight data recorder units 10, 11, and can also reduce or eliminate the risk of the flight data stored on the secondary flight data recorder unit 11 being accessed by unauthorized parties after retrieval of the ejected secondary flight data recorder unit 11.

Figure 2:
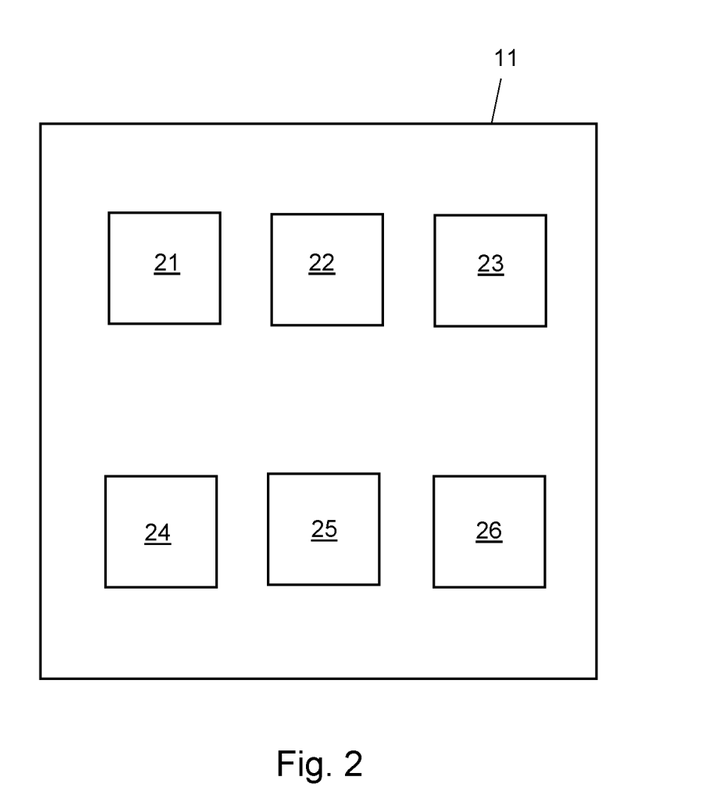
FIG. 2 shows a schematic view of an example secondary flight data recorder unit.

FIG. 2 shows the secondary flight data recorder unit 11 in more detail. The secondary flight data recorder unit 11 is configured to receive and store data from the primary flight data recorder unit 10. The secondary flight data recorder unit 11 is ejectable from the aircraft on which the apparatus 1 is installed, as will be explained in more detail further on with reference to FIGS. 3 and 4. The secondary flight data recorder unit 11 comprises a propulsion system 21 to enable powered flight of the secondary flight data recorder unit. In the illustrated example, the secondary flight data recorder unit 11 also comprises a power source 22, a guidance system 23, a memory 24, a locating system 25, and a communications interface 26.

The propulsion system 21 may comprise an electric motor, powered by the power source 22. The electric motor may drive one or more rotors and/or one or more propellers. In some examples the propulsion system 21 comprises one or more rotors which are configured to generate both lift and translational motion. In other examples, the secondary flight data recorder unit comprises a housing, the outer surface of which forms an aerofoil profile to generate lift. In such examples the propulsion system 21 may comprise one or more propellers which are configured to generate translational motion.

The power source 22 may comprise any power source suitable for powering an unmanned aerial vehicle (UAV). In some examples the power source may comprise a supply of chemical fuel and an engine configured to operate using that chemical fuel. In some examples the power source may comprise one or more solar cells. The power source may comprise a battery, such as a lithium-ion battery. The power source 22 may be capable of powering flight of the secondary flight data recording unit 11 for at least 60 minutes. Preferably, the power source 22 may be capable of powering flight of the secondary flight data recording unit 11 for at least 150 minutes. The power source 22 may be capable of powering flight of the secondary flight data recording unit 11 for a length of time sufficient for the secondary flight data recording unit 11 to cover a particular distance. In some examples the particular distance may be at least 100 miles. Preferably the particular distance may be at least 250 miles.

The guidance system 23 is to guide the secondary flight data recorder unit 11 to a selected destination. In some examples the guidance system comprises a gyroscope (e.g. a laser ring gyroscope) for detecting rotation of the secondary flight data recorder unit 11. In some examples the guidance system comprises a GPS system. The GPS system may comprise a GPS receiver chip. The GPS system may be configured to control the propulsion system 21 to propel the secondary flight data recorder unit 11 towards the selected destination. In some examples the selected destination comprises the nearest land-based location to the last recorded location of the aircraft. Suitable land-based locations may be pre-programmed into the guidance system 23. A land-based location may have to meet certain criteria in order to be deemed "suitable". For example, an uninhabited rock, or an ice sheet or iceberg, may not be deemed suitable. In some examples the selected destination comprises the location of a marine body (such as a ship, submarine or the like) near to the last recorded location of the aircraft. Current information about the location of such marine bodies may be obtained by the apparatus 1 during flight and provided to the secondary flight data recorder unit 11 as part of the flight data sent by the primary flight data recorder unit 10. The nearest land-based location or marine body to the last recorded location of the aircraft may be comprised in aircraft flight data stored in the memory 24 of the secondary flight data recorder unit 11. The nearest land-based location or marine body to the last recorded location of the aircraft may be comprised in aircraft flight data most recently received by the secondary flight data recorder unit 11 from the primary flight data recorder unit 10.

The memory 24 is for storing received data, in particular flight data received from the primary flight data recorder unit 10. The memory 24 may comprise, for example, a flash memory, a hard disc, a memory card or any other data storage system. The memory 24 may be rewritable. The memory 24 may be connected to the power source 22, to power writing and/or storage operations of the memory 24. In some examples the memory 24 has a database structure in which flight data can be stored in structured form. For example, the flight data can be stored in table form, in which the type of flight data can be organized in columns of the table and the time sequence of the flight data recording can be organized in lines of the table.

The memory 24 may be configured to store flight data relating to a predetermined time period ending at the acquisition time of the most recently received flight data. The predetermined time period may be at least 15 minutes. The predetermined time period may be in the range 5-60 minutes. The predetermined time period may be determined based on the storage capacity of the memory 24. The capacity of the memory 24 may be relatively small compared with the capacity of the memory of the primary flight data recorder unit 10. In some examples the capacity of the memory 24 may be less than 50% the capacity of the memory of the primary flight data recorder unit 10. The capacity of the memory 24 may be in the range 0.5-5 GB.

The flight data stored by the secondary flight data recorder unit 11 at any given time may be a subset of the flight data stored by the primary flight data recorder unit 10 at that time. In some examples, the flight data stored by the secondary flight data recorder unit 11 comprises all of the same types of flight data as the flight data stored by the primary flight data recorder unit 10, but covers a shorter time period. It will be appreciated that in certain circumstances (e.g. within the first few minutes of a flight, before the memory 24 has been filled to capacity), the flight data stored by the secondary flight data recorder unit 11 may be the same as the flight data stored by the primary flight data recorder unit 10. In some examples the flight data stored by the secondary flight data recorder unit 11 may comprise fewer types of flight data than the flight data stored by the primary flight data recorder unit 10. As a minimum, the flight data stored by the secondary flight data recorder unit 11 should comprise current data relating to the location of the aircraft, to facilitate finding the aircraft and/or the primary flight data recorder unit 10.

The memory 24 may be connected to the communications interface 26, to enable flight data received via the communications interface 26 to be stored in the memory 24. The secondary flight data recorder unit may be configured to continuously update the flight data stored in the memory 24 as new flight data is received from the primary flight data recorder unit. Updating the flight data stored in the memory 24 may comprise, for example, overwriting the oldest flight data (that is, the flight data acquired/generated the longest time ago) with the most recently received flight data. 12.

The locating system 25 is configured to transmit a localization signal for facilitating locating of the secondary flight data recorder unit 11. The localization signal may be suitable for transmission through air. In some examples the localization signal may be suitable for transmission through water. In some examples the locating system 25 is configured to transmit the localization signal at regular intervals, after recurring periods, for example every thirty minutes. The locating system 25 may comprise an emergency position indicating radio beacon or radio transmitter. It may be activated automatically, for example in response to ejection of the secondary flight data recorder unit from an aircraft. The locating system 25 may be configured to transmit on one or more standard emergency frequencies, which may for example be transferred via a satellite communication and/or ground stations to the respective rescue coordination centers. The locating system 25 may be connected to and thereby receive power from the power source 22.

The communications interface 26 is for receiving data from the primary flight data recorder unit 10, via the communications link 12. In some examples the communications interface 26 is a wireless communications interface for wirelessly receiving data from the primary flight data recorder unit 10. In such examples the communications interface 26 (and a corresponding communications interface comprised in the primary flight data recorder unit 10) may be configured to use any suitable wireless communications protocol such as Bluetooth, Wi-Fi, infrared, or ZigBee. The wireless communications protocol may permit short range wireless communications, e.g. over distances less than 1 m. In some examples the wireless communications protocol (or another of the wireless communications system used by the apparatus 1) may be configured to prevent medium or long range wireless communications, e.g. over distances greater than about 5 m. In some examples the communications interface 26 is a wired communications interface which is connectable to the primary flight data recorder unit 10 by a data cable of any suitable type. In such examples the communications interface 26 may comprise a mechanism for disconnecting the secondary flight data recorder unit 11 from a data cable during a process of ejecting the secondary flight data recorder unit 11 from an aircraft on which the apparatus 1 is installed.

In some examples the secondary flight data recorder unit 11 may further comprise a camera (not illustrated). Such a camera may be for acquiring image and/or video data after ejection of the secondary flight data recorder unit from the aircraft. In some examples such a camera may be configured to activate (that is, to begin acquiring image and/or video data) in response to ejection of the secondary flight data recorder 11 from the aircraft on which the apparatus 1 is installed. Such image/video data may comprise information relating to the fate of the aircraft after ejection of the secondary flight data recorder unit 11, and may thereby supplement the flight data stored by the secondary flight data recorder unit 11.

The secondary flight data recorder unit 11 may comprise a housing, which may enclose some or all of the components 21-26 described above. The housing may be watertight. An outer surface of the housing may have an aerodynamic profile. In some examples the outer surface of the housing forms an aerofoil profile. In some examples the housing has a saucer-like shape. An example saucer-shaped housing may have an aerofoil profile in cross-section, for any cross-section that it is possible to take through the housing. As such, a saucer-shaped housing may enhance stability of the secondary flight data recorder unit 11 during flight of the secondary flight data recorder unit 1. In some examples an outer surface of the secondary flight data recorder unit 11 may comprise one or more features for facilitating ejection from an aircraft, as will be described in more detail below. The secondary flight data recorder unit 11 may be relatively small and light compared with the primary flight data recorder unit 10. The total weight of the secondary flight data recorder unit 11 may less than half the weight of the primary flight data recorder unit. The largest dimension of the secondary flight data recorder unit may be less than half the largest dimension of the primary flight data recorder unit. The total weight of the secondary flight data recorder unit 11 may be less than 5 kg. In some examples the total weight of the secondary flight data recorder unit 11 may be in the range 2-4 kg. The largest dimension of the secondary flight data recorder unit 11 may be less than 50 cm. Preferably the largest dimension of the secondary flight data recorder unit may be less than 30 cm.

Figure 3:
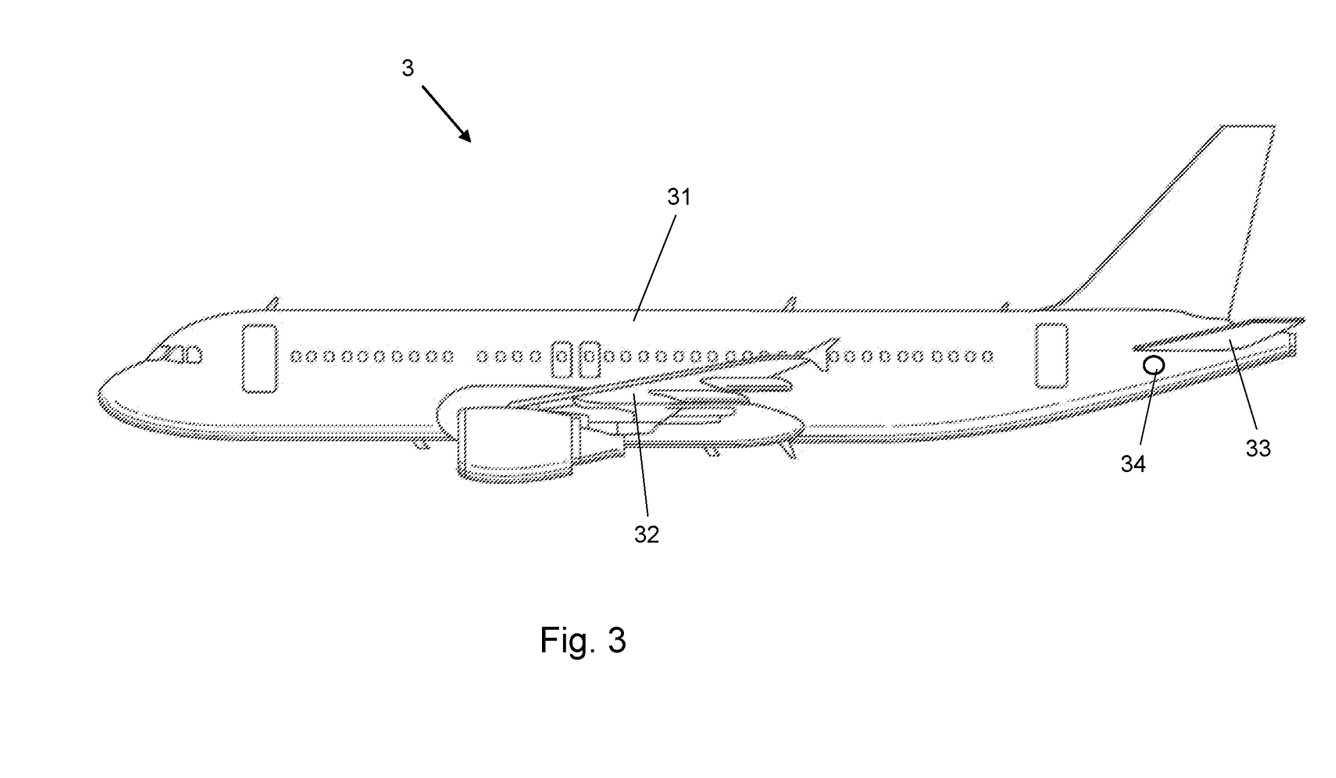
FIG. 3 shows an example aircraft comprising an apparatus to record aircraft flight data.

FIG. 3 shows an example aircraft 3 comprising an apparatus (not visible) for recording aircraft flight data. The apparatus may have any or all of the features of the example apparatus 1 described above, and in particular comprises a primary flight data recorder unit and a secondary flight data recorder unit as described above. The aircraft comprises a fuselage 31, a pair of wings 32 (only one is visible in FIG. 3) and a pair of tailplanes (horizontal stabilizers) 33 (only one is visible). In the illustrated example, the apparatus is located within the fuselage 31, in the tail region of the aircraft, as is conventional for flight data recorders. However; in other examples part or all of the apparatus may be located elsewhere on the aircraft 3. The primary flight data recorder unit and the secondary flight data recorder unit are located such that a reliable communications link can be maintained between the primary flight data recorder unit and the secondary flight data recorder unit. In some examples the secondary flight data recorder unit may be adjacent the primary flight data recorder unit. In some examples the primary flight data recorder unit and the secondary flight data recorder unit may be arranged such that there exists a line-of-sight transmission path between the primary flight data recorder unit and the secondary flight data recorder unit. The location of the secondary flight data recorder unit is selected to facilitate ejection of the secondary flight data recorder unit from the aircraft.

In examples in which the secondary flight data recorder unit comprises a rechargeable battery, the aircraft 3 comprises a charging system (not visible) configured to maintain the rechargeable battery in a substantially fully charged state. The charging system may be configured to maintain the rechargeable battery in a substantially full charged state for as long as the secondary flight data recorder unit is installed on the aircraft. The charging system may be of any suitable type known in the art. The charging system may be connectable to the secondary flight data recorder unit by a physical connection, e.g. comprising a plug, a socket and/or a cable. In such examples, the physical connection may be configured to automatically disconnect during an ejection of the secondary flight data recorder unit, as will be discussed below. In some examples the charging system may be configured to wirelessly transmit power to the rechargeable battery, in which cases no physical connection between the charging system and the secondary flight data recorder unit is required.

To enable ejection of the secondary flight data recorder unit from the aircraft 3, the aircraft 3 comprises an ejection conduit connecting the location of the secondary flight data recorder unit to the outside of the aircraft. The outlet 34 of the ejection conduit is beneath one of the tailplanes 33. The ejection conduit is configured to permit unobstructed passage of the secondary flight data recorder unit from its installed location on the aircraft to the outside of the aircraft. In some examples the ejection conduit is angled downwardly with respect to a normal operational orientation of the aircraft 3 (that is, such that the inlet of the conduit is higher than the outlet 34), so that passage of the secondary flight data recorder unit through the conduit may be assisted by gravity. During normal operation of the aircraft 3 the outlet 34 may be sealed, for example by any suitable door, hatch or panel. Such a door, hatch or panel may be openable by an ejection mechanism for ejecting the secondary flight data recorder unit from the aircraft.

Figure 4:
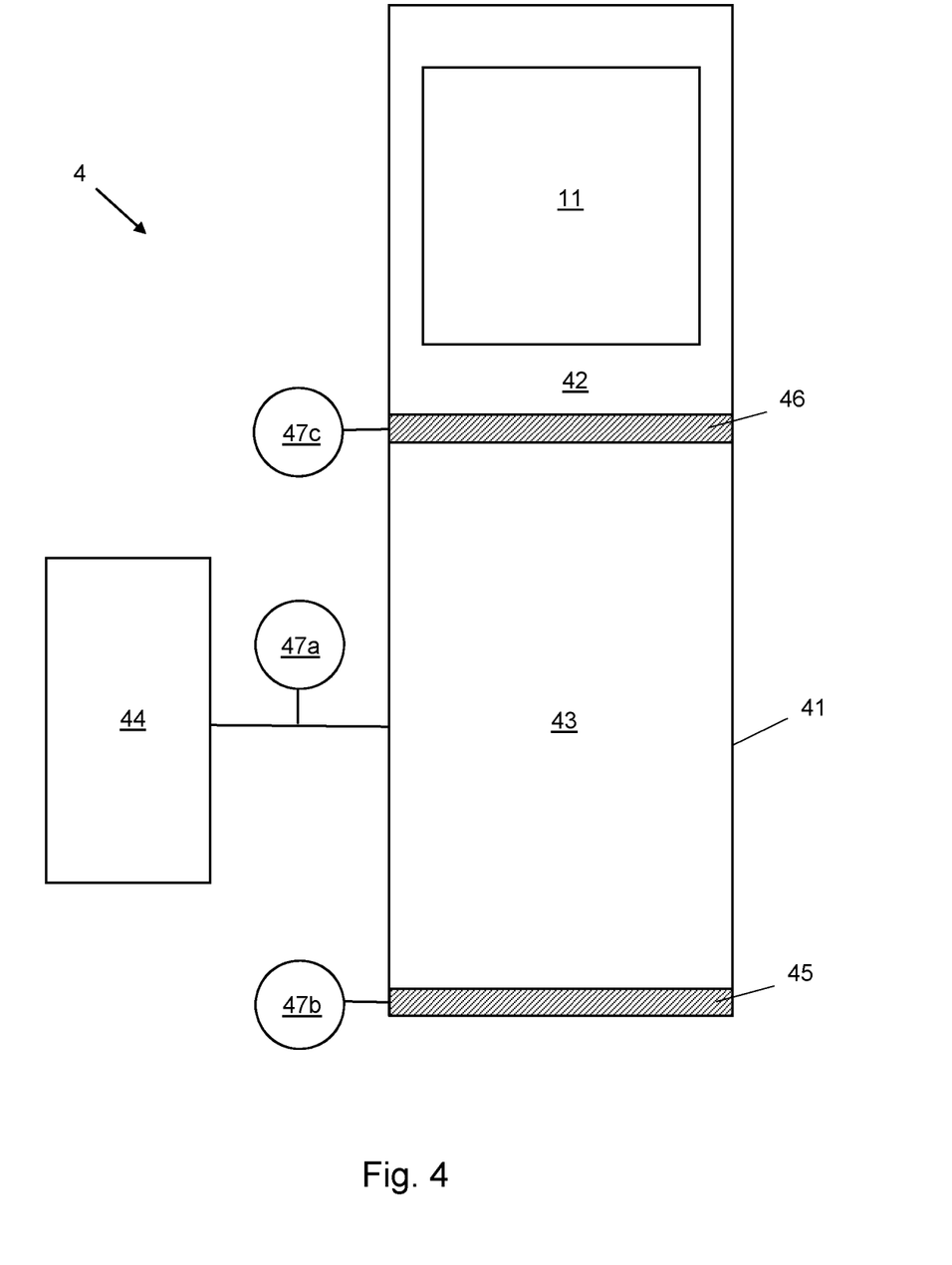
FIG. 4 shows an example ejection mechanism.

The aircraft 3 comprises such an ejection mechanism for ejecting the secondary flight data recorder unit from the aircraft 3 via the ejection conduit. FIG. 4 shows an example ejection mechanism 4, which is suitable for use as the ejection mechanism of the aircraft 3. The ejection mechanism 4 operates to eject the secondary flight data recorder unit 11 from the aircraft 3, via an ejection conduit 41. The ejection mechanism 4 is configured to activate in response to a predetermined criterion being met.

The example ejection mechanism 4 comprises a compressed gas source 44 for selectably delivering compressed gas into the ejection conduit 41 to create a suction force at the location 42 of the secondary flight data recorder 11. For example, the compressed gas source 44 may be connected to the interior of the ejection conduit 41 by a valve. The compressed gas source 44 is configured to deliver compressed air into the conduit in response to the predetermined criterion being met. This may be achieved, for example, by configuring a valve connecting the compressed gas source 44 to the interior of the ejection conduit 41 to open in response to the predetermined criterion being met. The gas in the compressed gas source 44 may be air, or any other suitable gas.

The ejection mechanism 4 further comprises a first selectably openable door 45 located at or near an outlet end of the ejection conduit 41, between the interior of the ejection conduit 41 and the outside of the aircraft 3. The ejection mechanism 4 further comprises a second selectably openable door 46 located at or near an inlet end of the ejection conduit 41, between the location 42 of the secondary flight data recorder unit 11 and the interior of the ejection conduit 41. In some examples, each of the first and second selectably openable doors 45, 46 is configured to open in response to the predetermined criterion being met. This may be achieved, for example, by providing one or more door opening mechanisms configured to activate in response to the predetermined criterion being met. In some examples one or both of the first and second selectably openable doors 45, 46 is configured to open in response to being contacted by the secondary flight data recorder unit 11 during its ejection from the aircraft. For example, a selectably openable door may be biased into a closed position but openable in response to a sufficient force being exerted on it. In some examples the secondary flight data recorder unit 11 may comprise a feature (e.g. an external surface feature) to facilitate opening of a selectably openable door. Such a feature may be a protrusion configured to be the first part of the secondary flight data recorder unit 11 to encounter the selectably openable door. Such a feature may be a tag or identifier detectable by a proximity sensor linked to a door opening mechanism, such that the door opening mechanism is activated when the proximity sensor detects the tag.

In some examples ejection of the secondary flight data recorder unit 11 is triggered by a high g-force being experienced by the aircraft. A high g-force in this sense is a g-force value likely to be experienced by the aircraft during a crash, but very unlikely to be experienced by the aircraft in any other operational scenario. In such examples the ejection mechanism may comprise at least one g-force sensor to measure current g-force on the aircraft. The predetermined criterion which must be met to trigger activation of the ejection mechanism comprises a minimum g-force threshold and is defined such that a current g-force less than the threshold does not meet the predetermined criterion and a current g-force greater than the threshold meets the predetermined criterion.

In the particular example of FIG. 4, the ejection mechanism 4 comprises three g-force sensors 47*a-c*, of any suitable type (e.g. any simple g-force microsensor). The first g-force sensor 47*a* is associated with the compressed gas source 44 and is configured to open (or to trigger the opening of) a valve connecting the compressed gas source 44 to the interior 43 of the ejection conduit 41 when the sensed g-force exceeds the minimum g-force threshold. The second g-force sensor 47*b* is associated with the first selectably openable door 45 and is configured to open (or trigger the opening of) the first selectably openable door 45 when the sensed g-force exceeds the minimum g-force threshold. The third g-force sensor 47*c* is associated with the second selectably openable door 46 and is configured to open (or trigger the opening of) the second selectably openable door 46 when the sensed g-force exceeds the minimum g-force threshold. In the particular example, the three g-force sensors 47*a-c* are configured with the same minimum g-force thresholds. However; alternative examples are possible in which a different minimum g-force threshold is configured for one or more of the g-force sensors 47*a-c*. Examples are also possible in which the three g-force sensors 47*a-c* are replaced by a single g-force sensor configured to simultaneously trigger opening of the compressed gas source 44, and opening of each of the selectably openable doors 45, 46. The level of the minimum g-force threshold(s) may be set by the owner or operator of the aircraft, based on any relevant considerations.

During normal operation of the aircraft 3 the g-force sensors 47*a-c* continuously monitor the g-force experienced by the aircraft, in real-time. In the event of a crash, the g-force will typically increase dramatically, to a level significantly above what might be experienced during normal operation of the aircraft, before the aircraft impacts the ground or water. When the g-force experienced by the aircraft meets or exceeds the level of the minimum g-force threshold, each of the g-force sensors 47*a-c* triggers the activation of its associated component (that is, the compressed gas release valve, the first selectably openable door 45 and the second openable door 46 respectively). In some examples further operations may also be triggered in response to the g-force meeting or exceeding the minimum g-force threshold, such as disconnection of a data cable from the secondary flight data recorder unit; disconnection of a charger from the secondary flight data recorder unit; and/or activation of a system (e.g. a propulsion system, a guidance system, a locating system, or the like) of the secondary flight data recorder unit 11.

When the compressed gas is released from the compressed gas source 44 into the interior 43 of the ejection conduit 41 by the opening of the valve, the gas flows out of the conduit 41 through the (now open) second selectably openable door 45 to the external environment. This gas flow creates a low pressure region at the other end (that is, the inlet end which is adjacent the location of the secondary flight data recorder unit 11) of the ejection conduit 41. The second selectably openable door 46 is open, meaning that a suction force is exerted on the secondary flight data recorder unit 11. The secondary flight data recorder unit 11 is thereby sucked into the ejection conduit 41, and its momentum carries it out of the outlet of the conduit 41 and away from the aircraft 3. Movement of the secondary flight data recorder unit 11 through the ejection conduit may be facilitated by gravity, depending on the orientation of the aircraft 3 at the time of ejection.

At any suitable point during the ejection process, the propulsion system (and, if present, the guidance system, the locating system and the camera) are activated. In some examples, activation of the systems which enable powered flight of the secondary flight data recorder unit 11 are activated by a g-force sensor. The minimum g-force threshold of such a g-force sensor may be the same as the minimum g-force threshold configured for the g-force sensors 47a-c, or it may be different. In some examples the secondary flight data recorder unit 11 is configured such that its systems are activated a predetermined delay time after the minimum g-force threshold is met or exceeded. This can ensure that the secondary flight data recorder unit 11 is outside the aircraft at the time its flight systems are activated. In some examples the secondary flight data recorder unit 11 is configured such that its systems are activated by proximity to a particular location on the aircraft, e.g. the outlet of the ejection conduit 41. In some examples the secondary flight data recorder unit 11 is configured such that it is activated when any one of a plurality of conditions is met (e.g. a minimum g-force threshold being met, a minimum proximity to the ejection conduit outlet being met, a delay time elapsing, or the like).

Other examples (not illustrated) may trigger ejection of the secondary flight data recorder unit based on one or more parameters other than g-force. In principle, any parameter which can be used to reliably detect an impeding crash of the aircraft may be used. For example, altitude and distance from an airport or other landing site may be used in combination. In such examples the predetermined criterion which must be met to trigger activation of the ejection mechanism may comprise a minimum distance from an airport/landing site and a maximum altitude, and may be defined such that the predetermined criterion is met if the current location of the aircraft is greater than the minimum distance and the current altitude of the aircraft is less than the maximum altitude, and is not met if the current location of the aircraft is less than the minimum distance and the current altitude of the aircraft is greater than the maximum altitude. In some examples the predetermined criterion may comprise a plurality of independent criteria, for example based on unrelated parameters, such that ejection is triggered if any of the criteria are met. For example, the predetermined criterion may comprise a g-force based criterion and an altitude and airport distance based criterion, and may be defined such that ejection is triggered if either of these individual criteria are met. It will be appreciated that in general, both criteria should be met in a crash scenario. However; that may not be the case if a sensor for detecting a relevant parameter has failed. A predetermined criterion which comprises multiple independent criteria can therefore ensure a highly reliable ejection triggering mechanism. The level of any threshold(s) comprised in a predetermined criterion for triggering ejection may be set by an owner or operator of the aircraft, based on any relevant considerations.

When the flight systems of the secondary flight data recorder unit 11 have been activated, they operate to fly the secondary flight data recorder unit 11 away from the crash location. In particular, the flight systems may operate to fly the secondary flight data recorder unit 11 towards the nearest land. This may be achieved, for example, by operating a propulsion system and a guidance system of the secondary flight data recorder unit 11 in the manner described above in relation to the operation of the example propulsion system 21 and the example guidance system 23. The locating system, once activated, may operate to facilitate locating of the secondary flight data recorder unit 11, for example in the manner described above in relation to the operation of the example locating system 26. In some scenarios the flight range of the secondary flight data recorder unit 11 may be sufficient for the secondary flight data recorder unit 11 to reach land, in which case it may be configured to land and await recovery, whilst continuing to operate the locating system for as long as power is available to do so. However; it is possible that the secondary flight data recorder unit 11 may not have sufficient power to reach land. Therefore, the secondary flight data recorder may be configured to land on the sea in such situations. To facilitate finding the secondary flight data recorder at sea, it may be configured to float, and/or be brightly coloured. Upon recovery of the secondary flight data recorder unit 11, from land or from water, the flight data stored can be accessed. In some examples, as mentioned above, the flight data may be encrypted so that it is only accessible by authorized parties. The flight data stored by the secondary flight data recorder unit 11 may be sufficient to determine circumstances that caused the accident which led to the ejection of the secondary flight data recorder unit 11. Preferably the flight data stored by the secondary flight data recorder unit is at least sufficient to significantly simplify locating the aircraft 3 and/or the primary flight data recorder unit 10.

Figure 5:
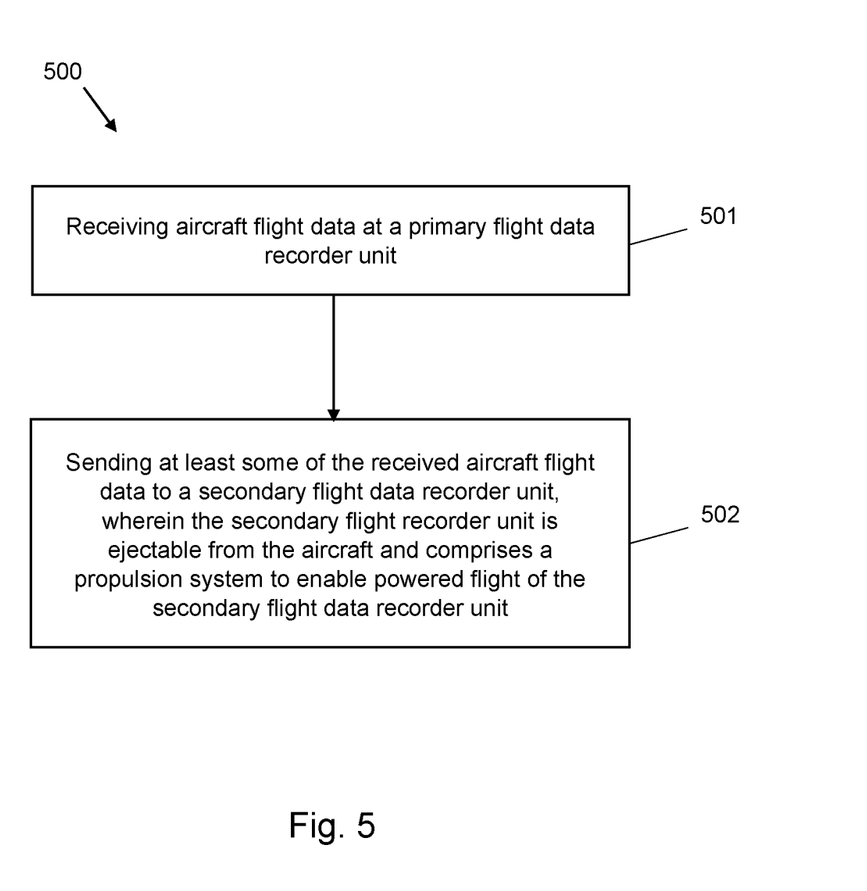
FIG. 5 is a flow chart illustrating an example method of recording aircraft flight data.

FIG. 5 is a flow chart that implements an example of a method 500 of storing aircraft flight data relating to the operation of an aircraft. The aircraft may be, for example, the aircraft 3 described above in relation to FIG. 3. Although the method 500 is described primarily with reference to the particular example apparatus 1, the method 500 may be performed using any apparatus according to the invention. The apparatus components referred to may have any of the features described above in relation to the example apparatus 1.

In a first block 501, aircraft flight data is received at a primary flight data recorder unit. The primary flight data recorder unit may have any of the features of the example primary flight data recorder unit 10 described above. The primary flight data recorder unit may comprise part of an apparatus for recording flight data, such as the example apparatus 1 described above. The flight data may have any of the features described above in relation to the operation of the apparatus 1, and receiving of the flight data by the primary flight data recorder unit may be performed in any of the ways described above in relation to the operation of the apparatus 1.

In block 502, the primary flight data recorder unit sends at least some of the received aircraft flight data to a secondary flight data recorder unit. The secondary flight recorder unit is ejectable from the aircraft and comprises a propulsion system to enable powered flight of the secondary flight data recorder unit. The secondary flight data recorder unit may have any of the features of the example secondary flight data recorder unit 11 described above. The secondary flight data recorder unit may comprise part of an apparatus for recording flight data, such as the example apparatus 1 described above. Block 502 may be performed in any of the ways described above in relation to the operation of the example apparatus 1.

Methods and apparatus according to the invention therefore enable flight data to be stored in such a manner that at least part of the flight data can be transported away from the aircraft in the event of an accident. The transported information may preferably be transported to a location that is easier to find and/or access than the location of the aircraft following the accident. The transported information may facilitate determining the circumstances of the accident and/or the location of the aircraft following the accident, thus simplifying the investigation into the accident.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An apparatus for recording aircraft flight data, the apparatus comprising:
   a primary flight data recorder unit configured to record data generated by aircraft systems during operation of an aircraft; and
   a secondary flight data recorder unit in communication with the primary flight data recorder and configured to receive and store data from the primary flight data recorder;
   wherein the secondary flight data recorder unit is ejectable from the aircraft, and comprises a propulsion system to enable powered flight of the secondary flight data recorder unit;
   wherein the secondary flight data recorder unit further comprises a guidance system configured to guide the secondary flight data recorder unit to a selected destination,
   wherein the selected destination comprises a land-based location nearest to a last recorded location of the aircraft, and
   wherein the land-based location nearest to the last recorded location of the aircraft is determined based on aircraft flight data most recently received, prior to ejection, by the secondary flight data recorder unit from the primary flight data recorder unit.

2. The apparatus according to claim 1, wherein the guidance system comprises one or more of: a gyroscope and a GPS system.

3. The apparatus according to claim 1, wherein the secondary flight data recorder unit comprises one or more of:
   a power source;
   a wireless communications interface for wirelessly receiving data from the primary flight data recorder unit;
   a wired communications interface connectable to the primary flight data recorder unit by a data cable;
   a locating system to transmit a localization signal for facilitating locating of the secondary flight data recorder unit;
   a memory for storing received data; and
   a camera for acquiring image and/or video data after ejection of the secondary flight data recorder unit from the aircraft.

4. The apparatus according to claim 1, wherein the propulsion system comprises an electric motor.

5. The apparatus according to claim 1, wherein the secondary flight data recorder unit comprises a housing.

6. The apparatus according to claim 1, wherein the secondary flight data recorder unit comprises an unmanned aerial vehicle (UAV).

7. The apparatus according to claim 1, wherein the primary flight data recorder unit is configured to continuously transmit current flight data to the secondary flight data recorder unit.

8. The apparatus according to claim 1, wherein the secondary flight data recorder unit is configured to store flight data relating to a time period ending at the acquisition time of a most recently received flight data, and is configured to update the stored flight data when new flight data is received from the primary flight data recorder unit.

9. An apparatus for recording aircraft flight data, the apparatus comprising:
   a primary flight data recorder unit configured to record data generated by aircraft systems during operation of an aircraft; and
   a secondary flight data recorder unit in communication with the primary flight data recorder and configured to receive and store data from the primary flight data recorder;
   wherein the secondary flight data recorder unit is ejectable from the aircraft, and comprises a propulsion system to enable powered flight of the secondary flight data recorder unit;
   wherein a total weight of the secondary flight data recorder unit is less than half of a total weight of the primary flight data recorder unit, and/or a largest dimension of the secondary flight data recorder unit is less than half of a largest dimension of the primary flight data recorder unit.

10. An aircraft comprising:
    a primary flight data recorder unit configured to record data generated by aircraft systems during operation of an aircraft;
    a secondary flight data recorder unit in communication with the primary flight data recorder and configured to receive and store data from the primary flight data recorder, wherein the secondary flight data recorder unit is ejectable from the aircraft, and the secondary flight data recorder comprises a propulsion system to enable powered flight of the secondary flight data recorder unit;
    a conduit connecting a location of the secondary flight data recorder unit to the outside of the aircraft, the conduit configured to enable ejection of the secondary flight data recorder unit from the aircraft; and an ejection mechanism for ejecting the secondary flight data recorder unit from the aircraft via the conduit, wherein the ejection mechanism is configured to activate in response to a predetermined criterion being met, wherein the ejection mechanism comprises a compressed air source configured for selectably delivering compressed air into the conduit to create a suction force at the location of the secondary flight data recorder, wherein the compressed air source is configured to deliver compressed air into the conduit in response to a predetermined criterion being met.

11. The aircraft according to claim 10, wherein the ejection mechanism comprises at least one g-force sensor to measure current g-force on the aircraft, and wherein the predetermined criterion comprises a minimum g-force threshold and is defined such that a current g-force less than the threshold does not meet the predetermined criterion and a current g-force greater than the threshold meets the predetermined criterion.

12. The aircraft according to claim 10, wherein the secondary flight data recorder unit comprises a rechargeable battery and the aircraft comprises a charging system configured to maintain the rechargeable battery in a substantially fully charged state.

13. An aircraft comprising:
a primary flight data recorder unit configured to record data generated by aircraft systems during operation of an aircraft; and
a secondary flight data recorder unit in communication with the primary flight data recorder and configured to receive and store data from the primary flight data recorder, wherein the secondary flight data recorder unit is ejectable from the aircraft, and comprises a propulsion system to enable powered flight of the secondary flight data recorder unit;
a conduit connecting a location of the secondary flight data recorder unit to outside of the aircraft, wherein the conduit is configured to enable ejection of the secondary flight data recorder unit from the aircraft; and
an ejection mechanism for ejecting the secondary flight data recorder unit from the aircraft via the conduit, wherein the ejection mechanism is configured to activate in response to a predetermined criterion being met, wherein the conduit comprises a first selectably openable door between an interior of the conduit and the outside of the aircraft, and a second selectably openable door between the location of the secondary flight data recorder unit and the interior of the conduit, wherein each of the first and second selectably openable doors is configured to open in response to the predetermined criterion being met.

14. A method comprising:
positioning an ejectable secondary flight data recorder unit in an aircraft adjacent a conduit in the aircraft and an ejection mechanism, wherein the conduit comprises a first selectably openable door between the an interior of the conduit and outside of the aircraft, and a second selectably openable door between the secondary flight data recorder unit in the aircraft and the interior of the conduit, wherein each of the first and second selectably openable doors are configured to open in response to a predetermined criterion being met, and the ejection mechanism is configured to eject the secondary flight data recorder through the conduit and out of the aircraft in response to the predetermined criterion being met;
receiving aircraft flight data at a primary flight data recorder unit; and
sending, by the primary flight data recorder unit, at least some of the received aircraft flight data to a secondary flight data recorder unit, wherein the secondary flight data recorder unit is ejectable from the aircraft and comprises a propulsion system to enable powered flight of the secondary flight data recorder unit.

15. An assembly configured to be mounted in an aircraft and comprising:
a primary flight data recorder unit configured to record data generated by aircraft systems during operation of the aircraft, wherein the primary flight data recorder unit is fixed to the aircraft and lacks a propulsion device; and
a secondary flight data recorder unit releasably mounted to the aircraft, and configured for data communication with the primary flight data recorder and configured to receive and store data from the primary flight data recorder; and
a propulsion system included with the secondary flight data recorder unit, wherein the secondary flight data recorder unit is ejectable from the aircraft and the secondary flight data recorder unit is configured to be propelled by the propulsion system after ejected from the aircraft,
a conduit configured to convey the secondary flight data recorder unit to outside of the aircraft, wherein the conduit comprises a first selectably openable door between the an interior of the conduit and the outside of the aircraft and a second selectably openable door between the location of the secondary flight data recorder unit and the interior of the conduit, wherein each of the first and second selectably openable doors is configured to open in response to a predetermined criterion being met, and
an ejection mechanism configured to eject the secondary flight data recorder unit from the aircraft via the conduit, wherein the ejection mechanism is configured to activate in response to the predetermined criterion being met.

16. The assembly of claim 15 further comprising an unmanned aerial vehicle (UAV) which includes the secondary flight data recorder and the propulsion system.

* * * * *